United States Patent [19]
Christensen

[11] 3,713,628
[45] Jan. 30, 1973

[54] KITCHEN BLENDER HAVING SELF-ALIGNING DRIVE MEANS

[75] Inventor: Arthur C. Christensen, Thomaston, Conn.

[73] Assignee: Scovill Manufacturing Company, Waterbury, Conn.

[22] Filed: Jan. 28, 1971

[21] Appl. No.: 110,439

[52] U.S. Cl. ............................. 259/108, 146/68 R
[51] Int. Cl. ......................................... B01f 7/16
[58] Field of Search ................. 259/108, 5-7, 9, 259/16, 8, 21-26, 32, -34, 40-46, 64-69, 107, DIG. 16, DIG. 25, DIG. 26, DIG. 27; 146/68 R, 68 A

[56] References Cited

UNITED STATES PATENTS

| | | |
|---|---|---|
| 2,755,900 | 7/1956 | Seyfried ........................ 259/108 X |
| 2,761,659 | 9/1956 | Colluru ......................... 259/DIG. 25 |
| 2,804,289 | 8/1957 | Schwangke ................... 259/DIG. 26 |
| 3,064,494 | 11/1962 | Dewenter ..................... 259/DIG. 26 |
| 3,344,829 | 10/1967 | Ripple .......................... 259/108 X |
| 3,493,214 | 2/1970 | Edwards et al. ............... 259/108 |

Primary Examiner—Jordan Franklin
Assistant Examiner—G. V. Larkin
Attorney—Dallett Hoopes

[57] ABSTRACT

A kitchen blender having self-aligning shafts has its agitator cap firmly fitted into a laterally movable support ring mounted on the blender base. The ring is in the form of a cup and in the preferred embodiment includes antifriction means to facilitate lateral movement.

6 Claims, 3 Drawing Figures

PATENTED JAN 30 1973　　　　　　　　3,713,628

INVENTOR
Arthur C. Christensen
BY Dallett Hoopes
ATTORNEY

KITCHEN BLENDER HAVING SELF-ALIGNING DRIVE MEANS

This invention relates to a kitchen blender of the type having a motor base with an upstanding coupling drive and a container sitting on the base with an agitator in the bottom connected to a downward mating coupling. More specifically, the invention relates in such a structure to self-centering means for the container primarily to lengthen the life of the motor and shaft bearings.

In the prior art, there have been many kitchen blenders of the general type which feature a motor base with a removable container connected to the motor through a coupling. In many such structures, especially precise mounting means were provided for the container to assure alignment of the motor shaft and the agitator shaft. No matter how many pains were taken, however, there invariably resulted misalignments of the two shafts with consequent bearing wear shortening the life of the blender.

Recent attempts have been made to permit a self-centering of the container. An example is shown in the comparatively recent U.S. Pat. No. 3,493,214 to Edwards. In such devices, the container was provided with a flanged bottom cap and the motor base provided with a large container support ring to permit the container to ride on its flange over a considerable area of lateral adjustment bringing the container into line with the shaft from the motor. Prior devices had the drawback that the looseness of the container within the container ring has promoted some instability of the container which when filled may be top-heavy.

Under the present invention, there is provided a snug fit between the container cap and the ring and lateral adjustment is permitted by the floating of the ring on the motor base, the ring being held down to the base by spring biasing means so that the parts of the assembly together are anchored one to another and the total assembly is stable and, at the same time, the arrangement permits the desired lateral movement of the container shaft with respect to the motor shaft.

Other features of the invention will be apparent from the following specification including the drawings wherein.

Figure 1:
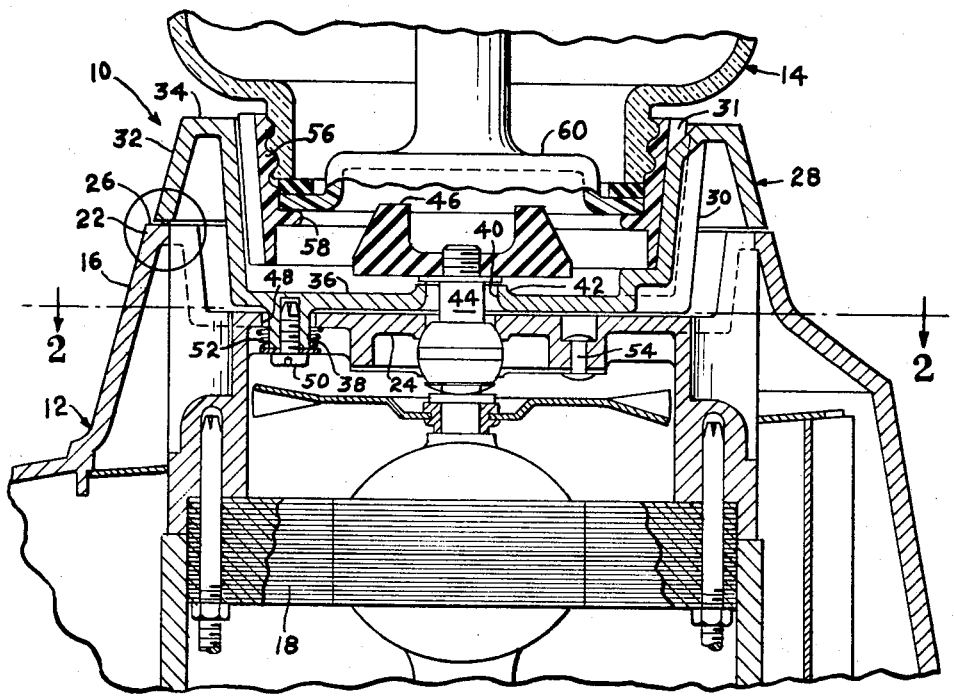
FIG. 1 is a fragmentary sectional view taken along a center line of a blender-container assembly embodying the invention.
Figure 2:
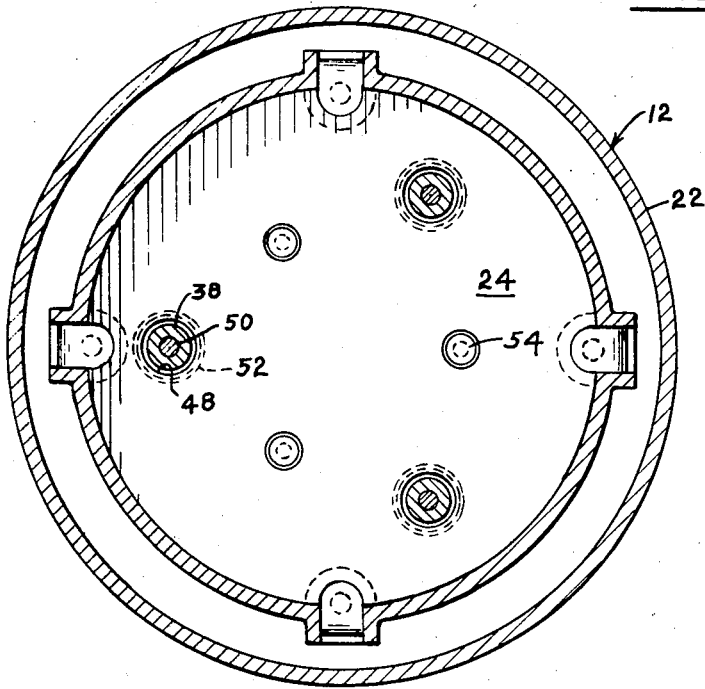
FIG. 2 is a sectional view taken on the plane of line 2—2 of FIG. 1.

Referring more specifically to the drawings, an apparatus embodying the invention is generally designated 10 in FIG. 1. It comprises a motor base 12 and a container 14. The motor base includes a plastic housing 16 of generally inverted cup shape containing a motor 18 rigidly bolted up to appropriate bosses in the housing. As shown, the housing is formed with a rim 22 encircling a depression having a flat floor 24. The top annular surface 26 is flat and smooth for reasons which will appear.

A container support ring 28 is provided. It includes a tapered sidewall 30 having spaced inward keys 31. From the upper end of the sidewall depends a slightly flaring skirt 32 which may be connected to the sidewall by a generally horizontal annular portion 34.

At its lower end, the ring is formed with a bottom wall 36 from which depend a plurality of studs 38. A central opening 40 is formed in the floor and encircled by an upward lip 42. As shown, the motor shaft 44 extends upward through the opening and a coupling end 46 is secured thereon for engagement with the other coupling end (not shown) attached to the bottom of the agitator shaft. The floor 24 is apertured as at 48 and receives the studs 38 with ample play to permit lateral movement of the ring 28. Enlargement means are provided in the lower end of each stud and comprise part of the ring assembly. The enlargement means are a headed and threaded fastener 50 which may include a washer as shown secured in each of the studs. A spring 52 extends from the washer up to the floor 24 to hold the ring downward. Rivet means 54 secure the upper motor bearing as is conventional.

The container 14 is equipped with the conventional threaded opening. A bottom cap 56 is provided with a serrated and tapered outer surface and a flange 58 which clamps the bottom wall 60 of the container in place. The bottom wall 60 is provided with a central mounting for an agitator (not shown).

Figure 3:
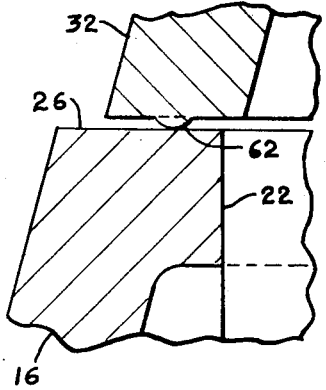
FIG. 3 is a greatly enlarged fragmentary view of an area circled in FIG. 1.

As shown in FIG. 3, the bottom end of the flared skirt 32 can be formed with a plurality of downward nibs 62 which ride on the top surface 26 of the housing rim. The nibs 62 serve as anti-friction means.

In use, the lower end of the container is set into the opening in the support ring 28. To prevent rotation of the container, the inward keys 31 engage in the serrations in the sidewall of the cap. With the container thus in place, it and the ring 28 are free to move laterally with respect to the base 12 until the coupling half of the container and the coupling half 46 of the motor base mutually engage and the motor shaft and the agitator shaft move into alignment. The spring means 52 bias the ring against the base so that there is no chance of the ring and container tipping with respect to the base.

By virtue of the invention as defined in language hereafter, simple, stable, means are provided for assuring that the shafts in the container and motor of a kitchen blender are always in alignment thereby reducing bearing wear.

I claim:

1. A kitchen blender comprising a housing rigidly mounting in its underside a motor, a vertical shaft in the motor extending up through an opening in the housing, an upward rim in the housing having a flat annular top surrounding the opening, a blender container having a tapered bottom cap, and a container-supporting ring laterally and shiftably secured to the housing and having a tapered inside wall adapted to snugly receive the bottom cap, the shaft of such container engaging and being aligned with the said shaft of the motor as the ring shifts laterally on the housing.

2. A kitchen blender as described in claim 1 wherein the ring includes a downward skirt, a lower edge on the skirt, the lower edge being supported laterally shiftably on the flat annular top of the rim.

3. A kitchen blender as described in claim 1 wherein the ring includes a lower wall disposed inside the rim and has spring means engaging the housing and the ring structure and biases the lower wall toward the housing.

4. A kitchen blender as described in claim 3 wherein the ring includes a plurality of downward projections on the lower wall extending downward respectively through apertures in the housing and having enlargement means on the distal end of each of the projections and the spring means comprises a compression spring surrounding each projection between the enlargement means and the housing.

5. A kitchen blender comprising a motor base having an upstanding shaft extending upward, the top of the base having a substantially circular recess therein surrounding the shaft, a container-mounting ring having a horizontal bottom wall extending into the recess and having a downward peripheral skirt with a lower end resting on the base, the ring being laterally shiftable on the base, and spring means engaging the ring and the base biasing the ring downward on the base.

6. A kitchen blender as described in claim 5 wherein antifriction nibs are disposed on the bottom of the skirt to reduce contact area between the skirt and the base.

* * * * *